United States Patent
Schilder et al.

(10) Patent No.: US 12,246,587 B2
(45) Date of Patent: Mar. 11, 2025

(54) ELECTRIC DRIVE SYSTEM FOR A MOTOR VEHICLE

(71) Applicant: MERCEDES-BENZ GROUP AG, Stuttgart (DE)

(72) Inventors: Tobias Schilder, Ludwigsburg (DE); Tobias Haerter, Stuttgart (DE); Jonathan Zeibig, Aalen (DE); Philip Gansloser, Bad Ditzenbach (DE); Carsten Gitt, Stuttgart (DE); Klaus Riedl, Tübingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/684,357

(22) PCT Filed: Aug. 2, 2022

(86) PCT No.: PCT/EP2022/071745
§ 371 (c)(1),
(2) Date: Feb. 16, 2024

(87) PCT Pub. No.: WO2023/020835
PCT Pub. Date: Feb. 23, 2023

(65) Prior Publication Data
US 2024/0351418 A1  Oct. 24, 2024

(30) Foreign Application Priority Data
Aug. 19, 2021  (DE) .............. 10 2021 004 237.9

(51) Int. Cl.
*B60K 1/02*  (2006.01)
*B60K 7/00*  (2006.01)
(Continued)

(52) U.S. Cl.
CPC ............... *B60K 1/02* (2013.01); *B60K 17/02* (2013.01); *B60K 17/046* (2013.01); *B60K 17/16* (2013.01)

(58) Field of Classification Search
CPC ........ B60K 1/02; B60K 17/02; B60K 17/046; B60K 17/16; B60K 2007/0092;
(Continued)

(56) References Cited

U.S. PATENT DOCUMENTS 7,384,357 B2   6/2008  Thomas et al.
9,221,334 B2   12/2015 Knoblauch
(Continued)

FOREIGN PATENT DOCUMENTS

AT   522931 A1    3/2021
CN   107985068 A  5/2018
(Continued)

OTHER PUBLICATIONS

Office Action dated Jul. 8, 2024 in related/corresponding JP Application No. 2024-509122.
(Continued)

*Primary Examiner* — Tinh Dang
(74) *Attorney, Agent, or Firm* — PATENT PORTFOLIO BUILDERS PLLC

(57) ABSTRACT

An electric drive system for a motor vehicle includes a first electric machine having a first rotor, a differential having a differential input shaft and a first differential output shaft and a second differential output shaft. The two differential output shafts are arranged coaxially with respect to the first rotor. A first side shaft is coupled to the first differential output shaft for conjoint rotation. A second side shaft is coupled, or is couplable, to the second differential output shaft for conjoint rotation. A second electric machine has a second rotor arranged coaxially with respect to the first rotor. A first (Continued)

switching element is configured to couple the first rotor to the first side shaft for conjoint rotation. A second switching element is configured to couple the second rotor to the second side shaft for conjoint rotation. The first rotor is coupled, or couplable, to the differential input shaft for conjoint rotation.

8 Claims, 2 Drawing Sheets

(51) Int. Cl.
    *B60K 17/02*     (2006.01)
    *B60K 17/04*     (2006.01)
    *B60K 17/16*     (2006.01)
    *F16H 48/24*     (2006.01)
    *F16H 48/36*     (2012.01)

(58) Field of Classification Search
    CPC ........ B60K 2023/043; B60K 2023/046; B60K 7/0007; B60Y 2200/91; B60Y 2400/607; F16H 48/11; F16H 48/24; F16H 48/36; F16H 2048/364
    See application file for complete search history.

(56) References Cited

U.S. PATENT DOCUMENTS

| | | | |
|---|---|---|---|
| 10,596,895 B2 * | 3/2020 | Morio | B60K 17/046 |
| 11,192,434 B2 | 12/2021 | Hummel et al. | |
| 2019/0176609 A1 | 6/2019 | Bando | |
| 2019/0283574 A1 | 9/2019 | Hummel | |
| 2020/0262293 A1 | 8/2020 | Glückler et al. | |
| 2020/0282827 A1 * | 9/2020 | Kaltenbach | B60K 1/02 |

FOREIGN PATENT DOCUMENTS

| | | |
|---|---|---|
| CN | 108839548 A | 11/2018 |
| CN | 111114308 A | 5/2020 |
| CN | 113173065 A | 7/2021 |
| DE | 102007021359 A1 | 3/2008 |
| DE | 102010005789 A1 | 7/2011 |
| DE | 102011056929 A1 | 6/2013 |
| DE | 102016218717 B3 | 2/2018 |
| DE | 102018129175 A1 | 5/2020 |
| DE | 102019102651 A1 | 8/2020 |
| EP | 3711999 A1 | 9/2020 |
| JP | 2008120138 A | 5/2008 |
| JP | 2011033077 A | 2/2011 |
| JP | 2011131634 A | 7/2011 |
| JP | 2013204688 A | 10/2013 |
| JP | 2013253622 A | 12/2013 |
| JP | 2017053430 A | 3/2017 |
| WO | 2020108689 A1 | 6/2020 |
| WO | 2020120721 A1 | 6/2020 |

OTHER PUBLICATIONS

International Search Report and Written Opinion mailed Nov. 23, 2022 in related/corresponding International Application No. PCT/EP2022/071748.
International Search Report and Written Opinion mailed Nov. 9, 2022 in related/corresponding International Application No. PCT/EP2022/071745.
Office Action created Nov. 24, 2022 in related/corresponding DE Application No. 10 2021 004 237.9.
Office Action created Nov. 3, 2022 in related/corresponding DE Application No. 10 2021 004 236.0.
Wikipedia; "Differentialgetriebe;" May 25, 2021; https://de.wikipedia.org/w/index.php?title=Differentialgetriebe&oldid=212344804.
Office Action dated Jul. 8, 2024 in related/corresponding JP Application No. 2024-509121.

* cited by examiner

| State | SE1 | SE5 | SE2 |
|---|---|---|---|
| Efficiency operation with one electric machine | | x | |
| Single wheel drive | x | | x |
| Differential lock operation with one electric machine | x | x | |
| Differential lock operation with two electric machines | x | x | x |
| Torque vectoring via differential | | x | x |

ELECTRIC DRIVE SYSTEM FOR A MOTOR VEHICLE

BACKGROUND AND SUMMARY OF THE INVENTION

Exemplary embodiments of the invention relate to an electric drive system for a motor vehicle, the drive system comprising an electric machine, a differential, and a transmission stage.

DE 10 2007 021 359 A1 describes such an electric drive device having an electric machine driving two differential output shafts or side shafts via a three-shaft planetary differential, which, in their turn, drive the wheels of the driven vehicle. The rotor of the electric machine and the planetary differential are arranged coaxially with respect to the side shafts.

Exemplary embodiments of the present invention are directed to an improved electric drive system, which makes possible a compact design in the axial direction and which, at the same time, can be shifted and operated very efficiently.

The electric drive system for a motor vehicle according to the invention comprises, similarly to the design in the prior art mentioned at the beginning, a first electric machine having a first rotor, and a differential gear having a differential input shaft and a first and a second differential output shaft. The differential output shafts are arranged coaxially with respect to the first rotor. The electric drive system also comprises a first side shaft coupled to the first differential output shaft for conjoint rotation therewith, and a second side shaft which is coupled, or can be coupled, to the second differential output shaft for conjoint rotation therewith.

A conjoint rotation connection in terms of the present invention is to be understood as a connection of two rotatably mounted elements, wherein these two elements are arranged coaxially with respect to one another and are connected to one another by the conjoint rotation connection such that they rotate at the same angular velocity.

According to the invention, a second electric machine is also provided, which has a second rotor arranged coaxially with respect to the first rotor. The first rotor is coupled, or can be coupled, to the differential input shaft for conjoint rotation therewith. Also, a first switching element allows the first rotor to be coupled to the first side shaft for conjoint rotation therewith. A second switching element is furthermore provided which makes it possible to couple the second rotor to the second side shaft for conjoint rotation therewith.

This design according to the invention of the electric drive system makes a very compact but still very flexible design possible, in which the side shafts and thus the wheels of the motor vehicle connected via the side shafts can be driven directly and independently of one another by one of the two electric machines via the first and the second switching elements. The design of the electric drive system according to the invention also allows both side shafts to be driven by the first electric machine alone via the rotor of the first electric machine, which rotor is coupled, or can be coupled, to the differential input shaft for conjoint rotation therewith. This results in a very efficient design, in which a differential operation using an electric machine or a single-wheel drive with torque vectoring is optionally possible. In normal differential operation, the second electric machine can be decoupled from the differential gear, so that it does not have to be carried along, which makes possible an increase in efficiency.

The differential gear itself can be designed in almost any manner. A typical design would be, for example, a differential gear in the form of a bevel gear with a differential cage. In order to then achieve a correspondingly compact design, in particular in the axial direction of the axes of rotation of the electric machines, the switching elements or at least one of the two switching elements can be designed to axially overlap the differential cage, i.e., can be located at least partially in a common plane perpendicular to the axial direction which contains not only the at least one switching element but also at least part of the differential cage. Accordingly, the system would then have to lie in a different radial plane, so that the elements do not hamper one another.

According to an extraordinarily favorable development of the electric drive system according to the invention, it is to be provided, however, for the differential gear to be designed as a three-shaft planetary differential. Such a three-shaft planetary differential having a sun gear, a ring gear, and a planetary carrier, or alternatively having a first sun gear, a second sun gear, and a planetary carrier, can be used as a differential gear. The differential input shaft can be connected to a first shaft of the three-shaft planetary differential, for example to the ring gear, for conjoint rotation therewith. The first differential output shaft can be connected to a second shaft of the three-shaft planetary differential, for example to the planetary carrier, for conjoint rotation therewith. And the second differential output shaft can be connected to a third shaft of the three-shaft planetary differential, for example to the sun gear, for conjoint rotation therewith. Such a design with the planetary differential, for example in the preferred interconnection mentioned, permits the design to be very compact in the axial direction, so that overall a more compact drive system is possible than with the bevel gear differential.

Particularly preferably, the differential gear has precisely one sun gear, precisely one planetary carrier and precisely one ring gear.

Now, another very advantageous embodiment of the electric drive system according to the invention can furthermore provide for the provision of a third switching element via which the first rotor can be coupled to the differential input shaft for conjoint rotation therewith. The connection between the first electric machine and the differential gear thus becomes selectable due to such a third switching element, so that, in particular in case of a single wheel drive via one of the electric machines, the differential gear does not have to be carried along, which makes the design particularly energy-efficient.

Viewed in the axial direction, it can be provided for the first electric machine, the first switching element, the differential gear, the second switching element, and the second electric machine to be arranged one after the other in the order mentioned. This makes the design quasi-symmetrical and—in particular, but not only, when using a planetary differential for a differential gear—also very compact in the axial direction.

As an alternative to a selectable connection of the first rotor to the differential gear, according to an extraordinarily favorable development of the electric drive system according to the invention, it can also be provided for the first rotor to be coupled to the differential input shaft for permanent conjoint rotation therewith, and for a fifth switching element to be provided via which the second differential output shaft can be coupled to the second side shaft for conjoint rotation therewith. The interconnection is thus relocated to the region of the second differential output shaft or the second side shaft and the connection of the second electric machine. Due to the permanent conjoint rotation connection of the first rotor of the first electric machine to the differential input shaft, it is thus possible to make the design for operation with the first electric machine extremely efficient and simple as regards control, since selection processes are only necessary here by means of the fifth switching element for the differential operation via the first electric machine. Otherwise, the system can be selected such that the second electric machine is completely decoupled or, in case of a single wheel drive, can be coupled easily and efficiently, while the first electric machine is permanently coupled to the other side shaft, in this case via the differential gear.

When the individual switching elements are selected independently of one another, it is furthermore possible to implement operation correspondingly with a differential lock not only with one electric machine (in this case: the first electric machine) but also with both electric machines.

As regards the control, it will be particularly efficient—and provided for according to a very advantageous development of the electric drive system according to the invention—if the first switching element, the second switching element and the fifth switching element are coupled in such a way that they can be actuated via a single actuator. Such an actuation via a single actuator is much more efficient compared to an actuation of each switching element via a separate actuator. On the one hand, only one actuator is necessary; on the other hand, by cutting down on further actuators, it is possible to save not only installation space and weight, but also lines which would have to lead to the individual actuators and which are complex to plan in the installation space available within a compact transmission. For this reason, a single actuator for actuating the three coupled switching elements is a considerable advantage.

Coupling of the three switching elements mentioned can preferably take place such that, in a first position of the actuator, the first switching element and the second switching element are closed, while the fifth switching element is open. In a second position of the actuator, the first switching element and the second switching element would then be open, while the fifth switching element is closed. With this design, it is possible to efficiently switch between operation with the first electric machine on the one hand and single wheel drive on the other hand, using the actuator.

According to a very advantageous development of this second embodiment variant with a differential input shaft and a first rotor connected permanently for conjoint rotation, it may then be provided according to a further very favorable embodiment that, viewed in an axial direction, the first electric machine, the differential gear, the first switching element, and the second electric machine are arranged one after the other in the order mentioned. This can be realized in a correspondingly compact manner and makes possible, in particular when a planetary differential is used, a very short design of the electric drive system in the axial direction. According to an advantageous embodiment, the first rotor, the second rotor, the differential gear, and the two side shafts are all arranged coaxially with respect to one another.

BRIEF DESCRIPTION OF THE DRAWING FIGURES

DETAILED DESCRIPTION

Figure 1:
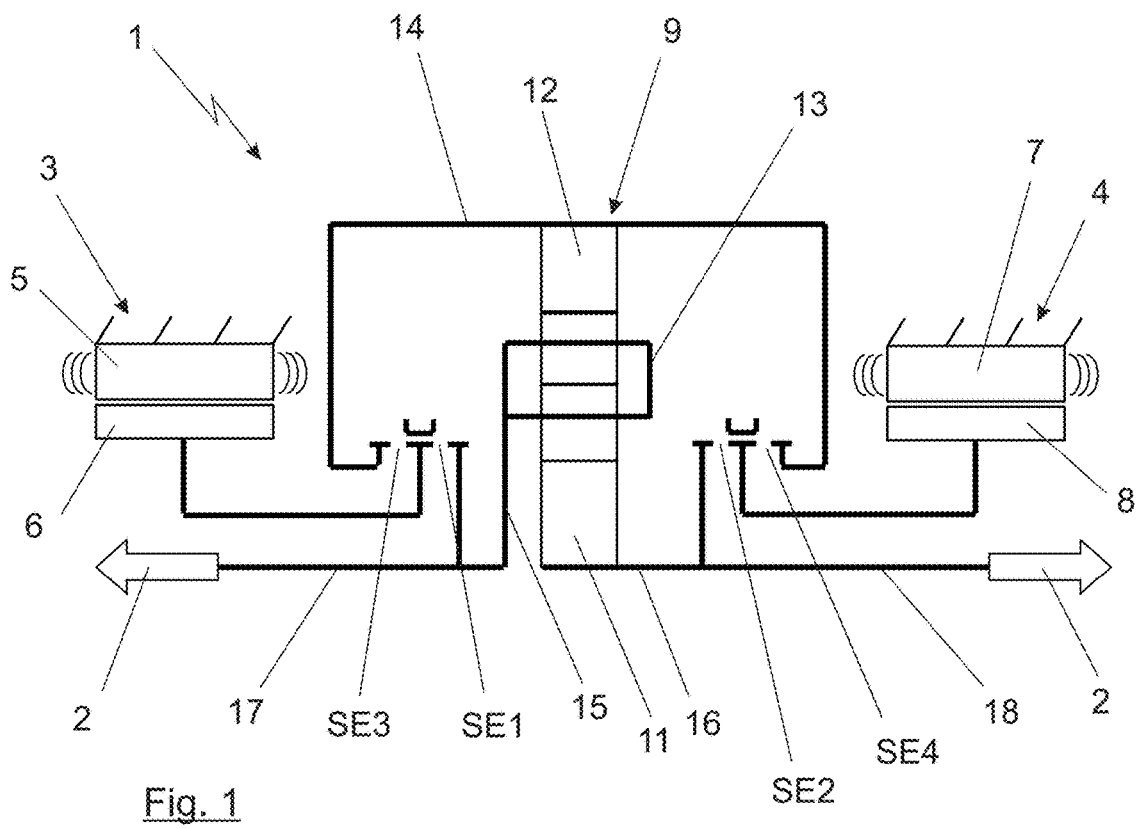
FIG. 1 shows a first possible design of the electric drive system according to the invention.

In the illustration in FIG. 1, an electric drive system 1 is shown that serves to drive a motor vehicle (not shown here). The drive power to the wheels of the motor vehicle is symbolized by the arrows denoted by 2, which thus as it were represent the driven wheels 2 of the motor vehicle 1. The electric drive system 1 has a first electric machine 3 and a second electric machine 4. A first stator 5 of the first electric machine 3 is connected to a housing of the electric drive system 1 for conjoint rotation therewith.

A first rotor 6 of the first electric machine 3 is arranged coaxially with respect to a second rotor 8 of the second electric machine 4. The second electric machine 4 has a second stator 7, which is likewise connected to the housing of the electric drive system 1 for conjoint rotation therewith. The two electric machines 3, 4 are thus arranged coaxially with respect to a common axis of rotation, which is formed here by the lower boundary of the representation in the figures. The illustration in the figures thus shows only the upper half of the otherwise rotationally symmetrical design. The common axis of rotation of the rotors 6, 8 of the electric machines 3, 4 defines an axial direction a of the electric drive system 1.

A differential 9 is located between the two electric machines 3, 4 viewed in the axial direction a. The differential 9 is advantageously arranged coaxially with respect to the common axis of rotation of the rotors 6, 8. This differential 9 could be designed, for example, as a bevel-gear differential with a differential cage. However, in order to be able to realize the design along the axial direction a as compactly as possible, the differential 9 is realized here as a planetary differential. This planetary differential comprises a sun gear 11, a ring gear 12, and a double planetary carrier 13. A differential input shaft 14 is connected to the ring gear 12. The double planetary carrier 13 is connected to a first differential output shaft 15 for conjoint rotation therewith, while the sun gear 11 is connected to a second differential output shaft 16. The first differential output shaft 15 is connected to a side shaft 17 for conjoint rotation therewith, which side shaft 17 establishes the connection to the driven wheel 2, for example directly or possibly even via a further transmission (not shown here). Something similar applies to a side shaft 18 which establishes the connection between the driven wheel on the right in the representation in FIG. 1 and the second differential output shaft 16.

A first switching element SE1 and axially adjacent thereto a third switching element SE3 are located on the side facing the first electric machine 3, axially adjacent to the differential gear 9 or, here, to the double planetary carrier 13 thereof. The first rotor 6 can be coupled, via the first switching element SE1, to the side shaft 17 and to the first differential output shaft 15 for conjoint rotation therewith. The first electric machine 3 then drives the driven wheel 2 shown here on the left-hand side. As an alternative, the first rotor 6 can be connected to the differential input shaft 14 and thus to the ring gear 12 of the differential 9 via the already mentioned switching element SE3, in order thus to drive both side shafts 17, 18 via the differential 9.

Viewed basically mirror-symmetrically with respect to the differential 9 in the axial direction a, a second switching element SE2 is located between the differential 9 and the second electric machine 4, namely axially adjacent thereto as viewed from the differential 9, and a fourth switching element SE4 is located axially adjacent thereto. The second switching element SE2 allows the second electric machine 4 or its rotor 8 to be connected to the right-hand side shaft 18 or to the second differential output shaft 16, as does the first switching element SE1 with regard to the first electric machine 3, in order to be able to drive the driven wheel 2 shown on the right in the representation in FIG. 1 via the second electric machine 4 alone. Alternatively, when the fourth switching element SE4 is engaged, the differential input shaft 14 can also be driven via the second electric machine 4 as an alternative or in addition to being driven by the first electric machine 3, in order thus to drive the two side shafts 17, 18 via the differential output shafts 15, 16 and by means of the differential 9.

This design permits great flexibility, whereby the output can take place not only via the one but also via the other of the two electric machines 3, 4, not only as a single wheel drive (in that case: in the torque vectoring mode) but also as a drive via the differential 9, for example by one of the electric machines 3, 4 or, in particular for boost operation, also via both electric machines 3, 4. Moreover, the two electric machines 3, 4 can also be decoupled, so that they do not have to be carried along when they are not required, which makes the electric drive system 1 according to the invention very energy-efficient.

Figure 2:
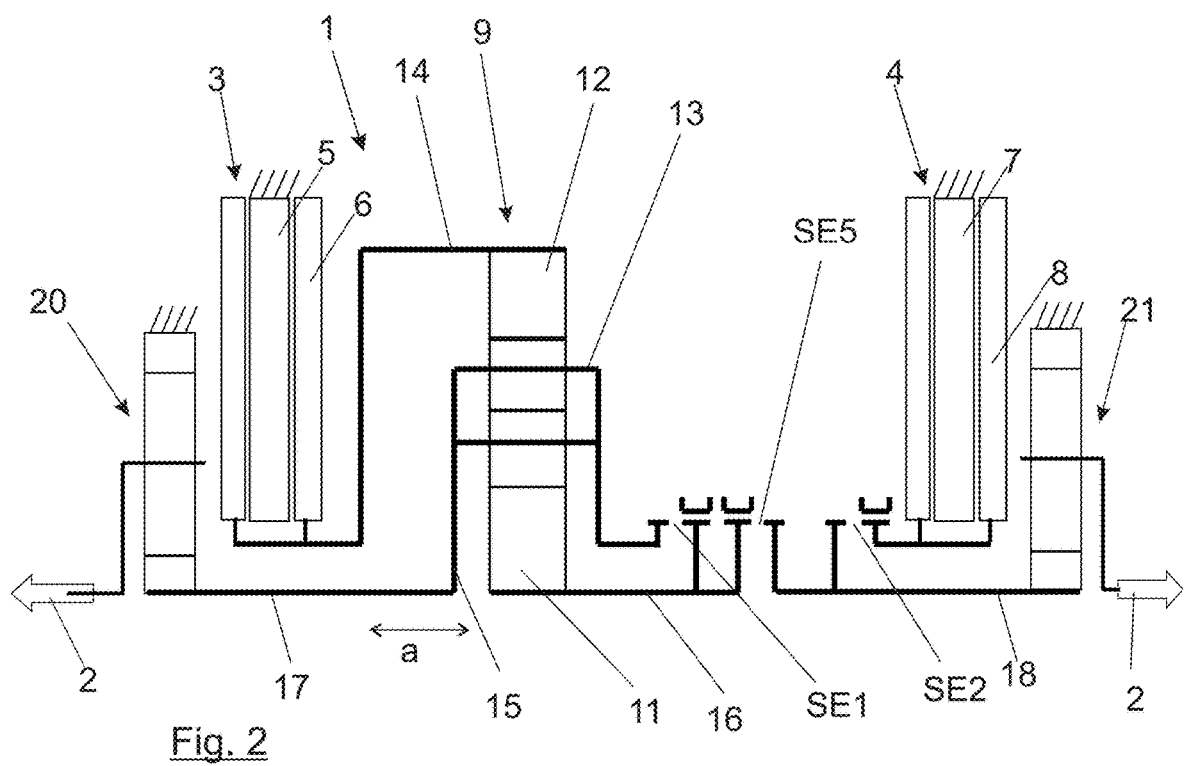
FIG. 2 shows a second possible design of the electric drive system according to the invention.

An alternative design of the electric drive system 1 can be seen in the representation of FIG. 2. Viewed in the axial direction a, here all switching elements, which will be discussed in more detail below, lie between the differential 9 in the form of a planetary differential and the second electric machine 4, which differential 9 is designed analogously to the representation in FIG. 1. The first rotor 6 of the first electric machine 3 is permanently connected to the differential input shaft 14 for conjoint rotation therewith. The first differential output shaft 15 and with it the left-hand side shaft 17 coupled to it for conjoint rotation therewith are in turn connected to the double planetary carrier 13 for conjoint rotation therewith, as was also the case in the embodiment according to FIG. 1. The first electric machine 3 and the differential 9 arranged directly adjacent to it in the axial direction a are followed in the axial direction a by the first switching element SE1.

The first switching element SE1 is configured here as a locking switching element and can connect the double planetary carrier 13 to the second differential gear output shaft 16 and thus to the sun 11 of the differential 9. In this locked state, in which the double planetary carrier 13 and the sun 11 circulate together, the first electric machine 3 is connected to the first differential output shaft 15 and thus to the left-hand side shaft 17 for conjoint rotation therewith.

Generally speaking, the first switching element SE1 is designed here as a locking switching element. In the design in FIG. 2, the differential 9 can also be designed, for example, as a bevel-gear differential, wherein the first switching element SE1 is then configured to lock the differential, whereby the same effect can be achieved as described above for the locking of the planetary differential.

Advantageously, in the torque flow, a transmission stage 20, 21, namely a first transmission stage 20 and a second transmission stage 21, are arranged between the left-hand side shaft 17 or the right-hand side shaft 18 and the wheels 2. These transmission stages 20, 21 can be used just as advantageously at the corresponding locations in the design according to FIG. 1. The advantageous features and configurations of the transmission stages 20, 21 mentioned below can also be used in the design according to FIG. 1. Advantageously, the transmission stages 20, 21 are designed as simple planetary gear sets, wherein a sun gear of the respective simple planetary gear set is in each case connected to the respective side shaft 17, 18 for conjoint rotation therewith, a ring gear of the respective simple planetary gear set is in each case connected to the housing for conjoint rotation therewith, and a planetary carrier of the respective simple planetary gear set is in each case coupled to the respective wheel.

Wheel side shafts (not further denoted) are provided between the transmission stages 20, 21 and the wheels, so that the transmission stages 20, 21 are advantageously arranged directly adjacent to the two electric machines 3, 4 and not, for example, near the wheels 2. Particularly advantageously, the transmission stages and the differential 9 are arranged in a common housing.

A fifth switching element SE5 is arranged in the axial direction a adjacent to this first switching element SE1. It can couple the second differential output shaft 16 to the right-hand side shaft 18 for conjoint rotation therewith, or it can also decouple these two elements from one another, as shown in the exemplary embodiment shown here. These two switching elements SE1 and SE5 are followed, again viewed in the axial direction a, by the second switching element SE2, which in turn is designed to connect the second electric machine 4 or the second rotor 8 to the right-hand side shaft 18. This second switching element SE2 could also be realized as an opening freewheel, which, when the fifth switching element SE5, i.e., the coupled second differential output shaft 16 and the right-hand side shaft 18, is engaged, opens accordingly and thus decouples the second electric machine 4. When the fifth switching element SE5 is open, the right-hand side shaft 18 could then be driven via the second electric machine 4 and the second switching element SE2 designed as a freewheel.

In case of a compact structural design, the design now allows a plurality of different states in the axial direction a. These states are correspondingly visualized in the switching table shown in the representation in FIG. 3. The switching elements SE1, SE2 and SE5 according to the representation in FIG. 2 are closed when a cross is indicated in the switching table, and are open if the corresponding field in the switching table is blank.

In the design in FIG. 2, the first transmission stage 20, the first electric machine 3, the differential 9, the first switching element SE1, the second electric machine 4, and the second transmission stage 21 are advantageously arranged in succession, in the order mentioned, viewed in the axial direction a.

In contrast, in the design in FIG. 1, viewed in the axial direction a, the first transmission stage 20 (which is not shown in FIG. 1), the first electric machine 3, the first switching element SE1, the differential 9, the second switching element SE2, the second electric machine 4, and the second transmission stage 21 (which is also not shown in FIG. 1) are advantageously arranged in succession, in the order mentioned.

In the embodiment in FIG. 2, the two electric machines 3, 4 are designed as axial-flux machines. A particularly compact axial design is possible with axial-flux machines; moreover, an overall very high-performance electric drive system 1 can be realized. The design of the electric machines 3, 4 as axial-flux machines is possible even with the embodiments in FIGS. 1 and 4, which would include the same advantages.

The first state is an efficiency operation with only one electric machine, here the first electric machine 3. In this case, the fifth switching element SE5 is closed, so that the second differential output shaft 16 is coupled to the right-hand side shaft 18, while the two other switching elements SE1 and SE2 are open. The first electric machine 3 then drives not only the first differential output shaft 15 but also the second differential output shaft 16 via the differential 9, while the second electric machine 4 is decoupled by the open second switching element SE2. This makes an efficient operation possible in which the first electric machine 3 drives, while the second electric machine 4 is at standstill.

By closing the two switching elements SE1 and SE2 and simultaneously opening the fifth switching element SE5, the planetary gearing serving as a differential 9 is blocked so that the first rotor 6 is connected to the left-hand side shaft 17 for conjoint rotation therewith, while the right-hand side shaft 18 is directly coupled to the second rotor 8 of the second electric machine 4 for conjoint rotation therewith via the second switching element SE2. This makes possible a single wheel drive in the torque vectoring mode, in which each of the driven wheels 2 can be driven via one of the electric machines 3 or 4 in each case. With this single wheel drive, there is no coupling between the left-hand side shaft 17 and the right-hand side shaft 18.

In addition, in the embodiment of the electric drive system 1 according to FIG. 2, a differential lock operation is possible not only with one electric machine but also with two electric machines 3, 4. Differential lock operation with one electric machine, i.e., in this case, the first electric machine 3, would, on the one hand, require locking the planetary differential used as a differential 9, so that the first switching element SE1 is closed. The fifth switching element SE5 connects the second differential output shaft to the right-hand side shaft 18, while the second switching element SE2 is open in order to thus decouple the second electric machine 4 correspondingly. The first electric machine 3 then drives both driven wheels 2 in differential lock operation.

By additionally closing the second switching element SE2, it is moreover possible to include the second electric machine 4 so that a differential lock operation is also possible with both electric machines together and thus with higher power.

The alternative design according to FIG. 2 makes possible yet another mode of operation, namely torque vectoring via the differential 9. In this further mode of operation, the fifth switching element SE5 and the second switching element SE2 are each closed, wherein the first switching element SE1 is open. In this case, the second rotor 8 is connected both to the right-hand side shaft 18 for conjoint rotation therewith and to the second differential output shaft 16 for conjoint rotation therewith. Part of a second torque of the second electric machine 4 is thus introduced into the right-hand side shaft 18 via the second rotor 8, wherein a further part of the second torque of the second electric machine 4 is introduced into the differential 9. At the same time, in this mode of operation, the first electric machine 3 feeds a first torque into the differential 9. In this mode of operation, the level of the torques supplied, namely the level of the first torque and the level of the second torque, make it possible to determine which torque levels ultimately arrive at the two side shafts 17, 18, wherein these two torque levels can be different.

Figures 3, 4:
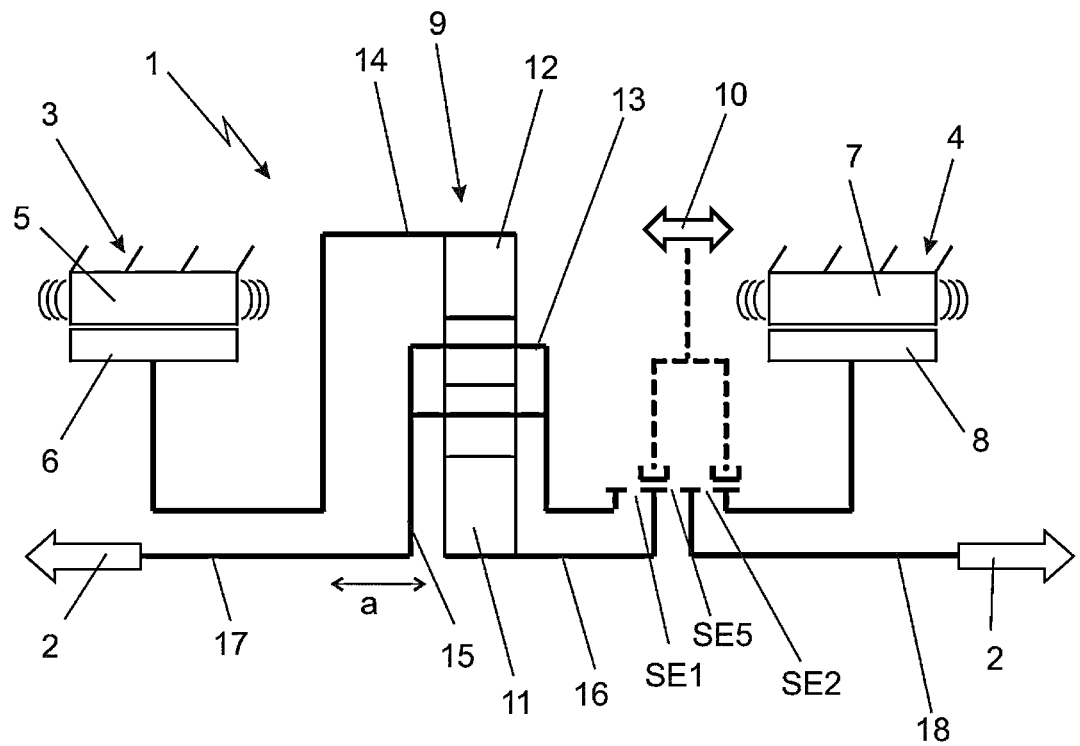
FIG. 3 shows a switching table for explaining the possible states of the electric drive system according to FIG. 2.
FIG. 4 shows an alternative embodiment of the electric drive system according to FIG. 2.

This mode of operation makes it necessary to control the three switching elements SE1, SE2 and SE5 independently of one another. This is relatively complex as regards the actuator system and routing the cables to the actuators for the individual switching elements SE1, SE2 and SE5. In order to reduce time and effort while ensuring the two most important states, namely efficiency operation with one electric machine and single wheel drive, the three switching elements SE1, SE2 and SE5 can also be coupled and controlled via a single actuator 10. This actuator 10 is shown in FIG. 4 which otherwise corresponds to FIG. 2. It makes possible a very simple and efficient control. This control can preferably be realized such that the first switching element SE1 and the second switching element SE2 are open, while the fifth switching element SE5 is correspondingly closed, so that according to FIG. 3 efficiency operation is implemented with one electric machine, namely the first electric machine 3 in this case. This switch position of the actuator 10 for efficiency operation is referred to here as a second position. In its other switch position, here referred to as the first position, the actuator 10 can then switch the three switching elements SE1, SE2, SE5 accordingly so that the first switching element SE1 and the second switching element SE2 are closed accordingly while the fifth switching element SE5 remains open. As can be seen again in the switching table in FIG. 3, this is the selection for single wheel drive, which makes it possible in torque-vectoring operation to drive one of the driven wheels 5 in each case, independently of one another, in each case via one of the electric machines 3, 4.

With this efficient combination of the three switching elements SE1, SE2, and SE5 via the one actuator 10, the further possibilities of differential lock operation would not apply, wherein differential lock operation can be implemented analogously in torque-vectoring operation on the software side, so that the elimination of mechanical differential lock operation does not constitute a substantial limitation.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An electric drive system for a motor vehicle, the electric drive system comprising:
a first electric machine having a first rotor;
a differential having a differential input shaft, a first differential output shaft, and a second differential output shaft, the first and second differential output shafts being arranged coaxially with respect to the first rotor;
a first side shaft is coupled to the first differential output shaft for conjoint rotation therewith;
a second side shaft is coupled, or is couplable, to the second differential output shaft for conjoint rotation therewith;
a second electric machine having a second rotor arranged coaxially with respect to the first rotor, wherein the first rotor is coupled or couplable to the differential input shaft for conjoint rotation therewith;

a first switching element configured to couple the first rotor to the first side shaft for conjoint rotation therewith, wherein the first switching element is a locking switching element; and a second switching element configured to couple the second rotor to the second side shaft for conjoint rotation therewith, wherein the differential gear is a planetary differential, wherein the differential input shaft is connected to a ring gear of the planetary differential for conjoint rotation therewith, wherein the first differential output shaft is connected to a double planetary carrier of the planetary differential for conjoint rotation therewith, and wherein the second differential output shaft is connected connectable via the first switching element to a sun gear of the planetary differential for conjoint rotation therewith.

2. The electric drive system of claim 1, wherein, viewed in an axial direction, the first electric machine, the first switching element, the differential, the second switching element, and the second electric machine are arranged one after the other in the order mentioned.

3. The electric drive system of claim 1, wherein the first rotor is coupled to the differential input shaft for permanent conjoint rotation therewith, and a third switching element is provided via which the second differential output shaft is couplable to the second side shaft for conjoint rotation therewith.

4. The electric drive system of claim 3, wherein the first switching element, the second switching element, and the third switching element are coupled in such a way that they are actuatable via a single actuator.

5. An electric drive system for a motor vehicle, the electric drive system comprising:
 a first electric machine having a first rotor;
 a differential having a differential input shaft, a first differential output shaft, and a second differential output shaft, the first and second differential output shafts being arranged coaxially with respect to the first rotor;
 a first side shaft is coupled to the first differential output shaft for conjoint rotation therewith;
 a second side shaft is coupled, or is couplable, to the second differential output shaft for conjoint rotation therewith;
 a second electric machine having a second rotor arranged coaxially with respect to the first rotor, wherein the first rotor is coupled or couplable to the differential input shaft for conjoint rotation therewith;
 a first switching element configured to couple the first rotor to the first side shaft for conjoint rotation therewith; and
 a second switching element configured to couple the second rotor to the second side shaft for conjoint rotation therewith,
 wherein the differential gear is a planetary differential,
 wherein the differential input shaft is connected to a ring gear for conjoint rotation therewith,
 wherein the first differential output shaft is connected to a double planetary carrier for conjoint rotation therewith, and
 wherein the second differential output shaft is connected to a sun gear for conjoint rotation therewith, wherein
 the first rotor is coupled to the differential input shaft for permanent conjoint rotation therewith, and a third switching element is provided via which the second differential output shaft is couplable to the second side shaft for conjoint rotation therewith,
 the first switching element, the second switching element, and the third switching element are coupled in such a way that they are actuatable via a single actuator
 in a first position of the actuator, the first switching element and the second switching element are closed, while the third switching element is open, and
 in a second position of the actuator, the first switching element and the second switching element are open, while the third switching element is closed.

6. The electric drive system of claim 5, wherein viewed in an axial direction, the first electric machine, the differential, the first switching element, and the second electric machine are arranged one after the other in the order mentioned.

7. The electric drive system of claim 1, wherein the first rotor, the second rotor, the differential, and the first and second side shafts are all arranged coaxially with respect to one another.

8. The electric drive system of claim 5, wherein the first rotor, the second rotor, the differential, and the first and second side shafts are all arranged coaxially with respect to one another.

* * * * *